Figure 1:
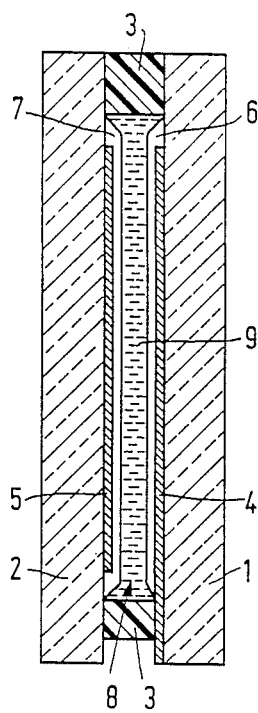

United States Patent [19]

Van Sprang et al.

[11] Patent Number: 4,767,191

[45] Date of Patent: Aug. 30, 1988

[54] DISPLAY CELL

[75] Inventors: Hendrik A. Van Sprang; Henricus G. Koopman; Franciscus J. M. Wortel, all of Eindhoven, Netherlands

[73] Assignee: U.S. Philips Corporation, New York, N.Y.

[21] Appl. No.: 37,478

[22] Filed: Apr. 13, 1987

[30] Foreign Application Priority Data

Nov. 14, 1986 [NL] Netherlands ......................... 8602891

[51] Int. Cl.⁴ ............................................. G02F 1/137
[52] U.S. Cl. .................................................. 350/341
[58] Field of Search ........................ 350/341; 528/403

[56] References Cited

U.S. PATENT DOCUMENTS

| 4,247,658 | 1/1981 | Arrowsmith | 428/295 |
| 4,514,043 | 4/1985 | Ahne et al. | 350/341 |
| 4,657,832 | 4/1987 | Pfeifer | 430/18 |
| 4,680,195 | 7/1987 | Pfeifer | 427/44 |

FOREIGN PATENT DOCUMENTS

| 1302652 | 12/1970 | Fed. Rep. of Germany | 528/404 |
| 3138556 | 4/1983 | Fed. Rep. of Germany | 350/341 |

Primary Examiner—Stanley D. Miller
Assistant Examiner—Anita Pellman
Attorney, Agent, or Firm—Norman N. Spain

[57] ABSTRACT

A display cell which contains a liquid crystalline compound having a tilted orientation and a tilt angle of 8°–50°, in which an orientation layer is used of a cycloaliphatic polyether.

7 Claims, 1 Drawing Sheet

U.S. Patent

Aug. 30, 1988

4,767,191

DISPLAY CELL

The invention relates to a display cell comprising two closely-spaced parallel transparent substrate plates which are interconnected along their periphery by means of a seal, and which plates are provided with an electrode carrying an orientation layer on their facing surfaces, which orientation layer provides a tilted orientation to a liquid crystalline compound which is introduced into the space bounded by the plates and the seal.

Such a cell is known from, for example, German Auslegeschrift Pat. No. 2,315,541 and from an article by H. A. Sprang and R. G. Aartsen in J. Appl. Phys. 56 (2), July 15, 1984, pp. 251-261.

In the known cell a tilted orientation of the molecules of the liquid crystalline compound is obtained by using a layer of SiO as an orientation layer which is vacuum evaporated on the substrate surface at an angle of 80°-86° with regard to the normal to this surface. In other words an oblique vacuum evaporation. At the interface between the cell medium which contains the liquid cyrstalline compound and the orientation layer the molecules of the liquid crystalline compound are oriented at an orientation angle (tilt angle) to the surface of the orientation layer. The orientation layer is calculated relative to the surface of the orientation layer.

An SiO orientation layer has the disadvantage that the application method, i.e. the oblique vacuum evaporation process, is a time-consuming procedure the process parameters of which, such as gas pressure, deposition rate, definition of the area on which the SiO deposition is to be carried out, cannot readily be controlled. The reproducibility of the process is not satisfactory. The magnitude of the tilt angle has been found to depend upon the conditions of evaporation, in particular upon the $H_2O/O_2$ background pressure. Furthermore, a vacuum evaporation process is a very unattractive process step in the large-scale manufacture of display cells.

It is an object of the invention to provide a display cell in which the above-mentioned disadvantages have been overcome.

A particular object of the invention is to provide a cell whose orientation layer, by means of which a tilted orientation can be obtained, can be applied in a readily conceivable, economical and above all reproducible manner.

A further object is to provide a display cell whose tilt angle can be satisfactorily defined and which has a high value of approximately 8°-50° and in particular of 15°-30°.

These objects are achieved with a display cell of the type mentioned in the opening paragraph, which is characterized in that the orientation layer is a polymer layer which essentially contains a cyclo-aliphatic polyether.

Polymers of a cyclo-aliphatic polyether are known per se. Reference can be made to U.S. Pat. Specification No. 27 64 559 which is considered to be incorporated herein by reference.

The polymer layer can be applied in a readily conceivable, reproducible manner in a standard process. To this end the polymer is dissolved in a suitable organic solvent such as cresol or a mixture of cresol and toluene, in a concentration which does not have to be within narrow limits, such as 0.1-10% by weight and in particular 1-5% by weight. The solution is spun on the substrate plates which are provided with electrodes. Subsequently, the layer is baked by heating at a relatively high temperature of, for example, 300°-350° C. for some time, for example one hour. Next, the layer is rubbed in a conventional manner with a roller and, if necessary, heated again. The tilt angle obtained with this layer ranges from 8° to 50° dependent upon the conditions of rubbing and the polyether and the liquid crystalline compound used. In the above-described process the tilt angle is very well defined and is fully reproducible.

A suitable tilt angle is in particular an angle which ranges from 15°-30° and which is obtained by repeatedly rubbing with a frictional force of approximately 10N. A large tilt angle from 40°-50° can be obtained by rubbing only once with a small frictional force of 5N.

In an efficacious embodiment the orientation layer contains one copolymer of two or more monomers, at least two monomers of which are a cyclo-aliphatic ether compound.

In a further efficacious embodiment the orientation layer contains a copolymer of the above-said monomers and a monomeric epoxy alkane compound.

In the display cell according to the invention, preferably, an orientation layer is used which contains a polymer of an epoxycycloalkane compound. A very good example thereof is 1.4-epoxycyclohexane.

In a further preferred embodiment an orientation layer is used which is formed of a copolymer of an epoxycycloalkane compound and tetrahydrofuran. In this embodiment a tilt angle of approximately 20° is obtained.

In yet another preferred embodiment of the display cell a terpolymer of an epoxycycloalkane compound, tetrahydrofuran and an epoxy alkane compound is used. Ethylene oxide is a suitable example of the epoxy alkane compound.

Of particular importance is an embodiment of the display cell according to the invention, which is twisted through 270° and in which the director of the liquid crystalline molecules is rotated across the cell thickness, i.e. from one substrate plate to the other, through an angle of 270°.

This interesting embodiment is characterized in that the molecules of the liquid crystalline compound form a tilt angle of 15°-30° with the surface of the orientation layer which is formed of a polymer layer which contains a cycloaliphatic polyether, and in that the molecules between the substrate plates are rotated through an angle of 270°.

With respect to the last-mentioned embodiment it is to be noted that at present there is a tendency to develop cells which are twisted through 270°. In the previously described known display cell which contains an SiO orientation layer such a twist through 270° is possible. As has been said above, this known cell has the disadvantage that the tilt angle is insufficiently defined and that it is less suitable for large-scale production. The latter aspect renders said cell unsuitable for practical use. Display cells which can at present be manufactured in a large-scale production process contain a polyimide orientation layer. However, the maximum obtainable tilt angle with such an orientation layer is only 4°-5°, and the maximum twist is 180°. Such a cell has the disadvantage that the curve which shows the correlation between transmission and electric operating voltage is less steep than desired. Consequently, the cell either exhibits a reduced contrast or a greater difference in voltage is necessary, which means that there are fewer scanning lines and hence a reduced sharpness.

These problems are overcome by the present invention which makes it possible to mass produced 270° twisted cells by means of a process which can readily be standardized.

Figure 2:
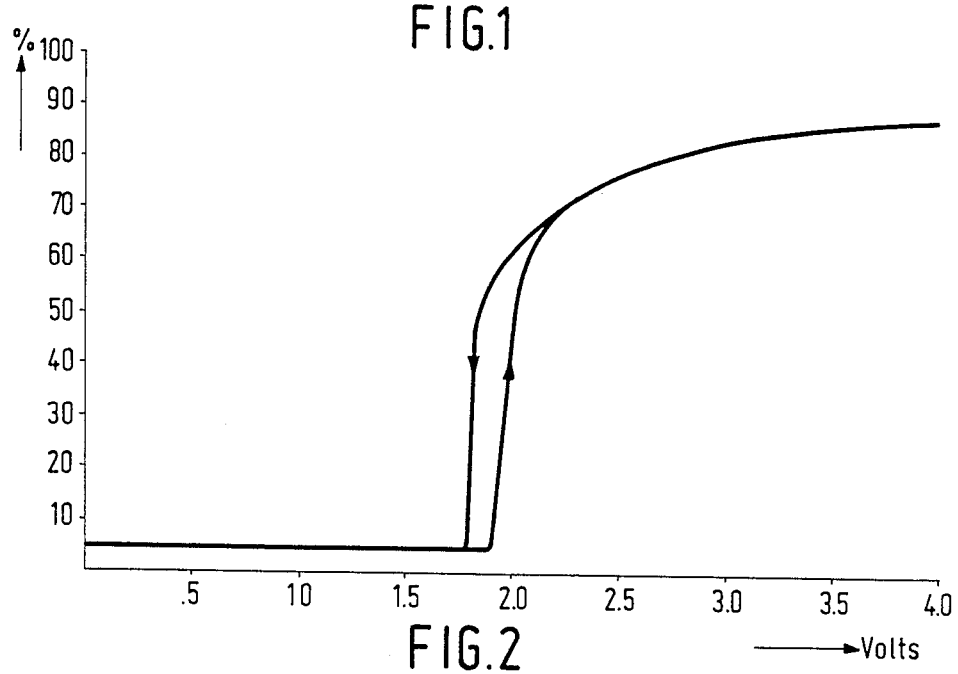

The invention will now be explained in more detail with reference to the drawing in which FIG. 1 is a cross-sectional view of a cell according to the invention, and FIG. 2 is a graph of the voltage-transmission characteristics of the cell according to the invention, in which the transmission is plotted in a percentage figure on the vertical axis against the voltage (in Volts) on the horizontal axis.

Reference numerals 1 and 2 in FIG. 1 designate two parallel transparent substrate plates which are spaced at some distance from each other. The plates are made of glass. The distance between the plates is approximately 6 $\mu$m, which is ensured by the presence of glass spacers (not shown) between the plates. The plates are interconnected at their periphery by means of a sealing ring 3 which is made of a polymer product and, in particular, an adhesive. At their facing surfaces the plates 1 and 2 are provided with transparent electrodes 4 and 5, respectively, which are made of, for example, ITO (indium-tin oxide). The electrodes 4 and 5 are coated with an orientation layer 6 and 7, respectively, which is manufactured from the copolymer of 1.4-epoxycyclohexane and tetrahydrofuran. The space 8 which is enclosed by the substrates 1 and 2 and the ring 3 is filled with a cell medium which contains a liquid crystalline material 9 such as, for example, a mixture of phenylcyclohexane derivatives as marketed by Messrs. Merck under the code ZLI 1132. The molecules of the liquid crystalline material 9 are oriented under the influence of the orientation layer 6 and 7, respectively, and form an orientation angle (tilt angle) of about 20° with the surface of the layers 6 and 7, respectively. The tilt angle is calculated relative to the normal to the faces 6 and 7. The director of the molecules of the liquid crystalline material between the plates 1 and 2 rotates through an angle of 270° from the one substrate plate, for example plate 1, to the other substrate plate 2. This rotation across the cell is called twist. This twist through 270° is possible because the tilt angle is steep. The twist is carried out according to a technique which is known per se, namely by rubbing the orientation layers 6 and 7 in different, mutually perpendicular directions and adding a chiral substance to the cell medium.

The above-described display cell is produced as follows. A copolymer comprising 70% by weight of 7-oxabicyclo-2.2.1 heptane (epolycyclohexane) and 30% by weight of tetrahydrofuran is dissolved in m-cresol or a mixture thereof with toluene to obtain a 2.5% solution. By means of a spin process the solution is provided on the previously properly cleaned substrate plates 1, 2 which are provided with the electrodes 4, 5. After the copolymer layer has dried and the solvent vapourized, it is baked for one hour at a temperature of 330° C. Subsequently, the surface of the layer is rubbed repeatedly with a roller on which a force of approximately 10N is exerted. The direction in which the orientation layer of the substrate plate 1 thus produced is rubbed differs 90° from that of the layer on the substrate plate 2. Due to such an orientation layer of the copolymer, a liquid crystalline material provided on the layer has a tilt angle of approximately 20°. By varying the copolymer used, the liquid crystalline compound used and the frictional force a variation in the tilt angle of between approximately 15° and 30° can be obtained.

The substrates 1, 2 which have been provided with an orientation layer in the manner described above and which carry the electrodes 4, 5 are bonded to one another by means of an adhesive whilst interposing a sealing ring 3 and adding glass fibres as spacers. Subsequently, the enclosed space 8 is filled via an aperture in ring 3, which is not shown, with a liquid crystalline material as described above.

Finally, the feed opening is closed. Thus, the display cell as shown in FIG. 1 is obtained. The cell has a twist of 270°.

Display cells with different copolymer compositions are manufactured in the same way. For example, display cells have been manufactured by using a copolymer which comprises 80% by weight of 1.4-epoxycyclohexane and 20% by weight of tetrahydrofuran, and by using a copolymer which comprises 79% by weight of 1.4 epoxycyclohexane, 15% by weight of tetrahydrofuran and 6% by weight of ethylene oxide. Dependent upon the frictional force tilt angles are obtained of approximately 15° to 30°.

The graph of FIG. 2 shows a transmission-voltage characteristic of the display cell according to the invention. The curve is very steep. When a voltage of approximately 1.9 Volt is applied, a slight increase in voltage leads to a large increase of the transmission. Consequently, when the voltage interval is small there is a large difference in transmission, which is of vital importance to the optimal operation of the display cell according to the invention.

What is claimed is:

1. A display cell comprising two closely-spaced parallel transparent substrate plates which are interconnected along their periphery by means of a seal, and which plates are provided with an electrode carrying an orientation layer on their facing surfaces, which orientation layer provides a tilted orientation to a liquid crystalline compound which is introduced into the space bounded by the plates and the seal, characterized in that the orientation layer is a polymer layer which essentially contains a cycloaliphatic polyether.

2. A display cell as claimed in claim 1, characterized in that the orientation layer contains a copolymer of two or more monomers, at least two monomers of which are a cycloaliphatic ether compound.

3. A display cell as claimed in claim 2, characterized in that the mixture of monomers also contains a monomeric epoxy alkane compound.

4. A display cell as claimed in claim 1 characterized in that the orientation layer contains a polymer of an epoxycycloalkane compound.

5. A display cell as claimed in claim 4, characterized in that the orientation layer contains a copolymer of an epoxycycloalkane compound and tetrahydrofuran.

6. A display cell as claimed in claim 5, characterized in that the orientation layer contains a copolymer of an epoxycyclohexane, tetrahydrofuran and an ethylene oxide.

7. A display cell as claimed in claim 1, characterized in that the molecules of the liquid crystalline compound form a tilt angle of 15°-30° with the surface of the orientation layer which is formed of a polymer layer which contains a cyclo-aliphatic polyether, and in that the molecules between the substrate plates are rotated through an angle of 270°.

* * * * *